US012203619B2

(12) United States Patent
Jun

(10) Patent No.: US 12,203,619 B2
(45) Date of Patent: Jan. 21, 2025

(54) LAMP HAVING LIGHT SOURCES WITH CORRESPONDING ARRAY OF CENTRAL AND PERIPHERAL MULTI-FACETED- LENS FORMING CENTRA AND PERIPHERAL PARTS OF A LIGHT DISTRIBUTION

(71) Applicant: HYUNDAI MOBIS CO., LTD., Seoul (KR)

(72) Inventor: Young Geun Jun, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 18/588,267

(22) Filed: Feb. 27, 2024

(65) Prior Publication Data

US 2024/0288137 A1 Aug. 29, 2024

(30) Foreign Application Priority Data

Feb. 28, 2023 (KR) ........................ 10-2023-0027011

(51) Int. Cl.
*F21S 41/265* (2018.01)
*F21S 41/143* (2018.01)

(52) U.S. Cl.
CPC ........... *F21S 41/265* (2018.01); *F21S 41/143* (2018.01)

(58) Field of Classification Search
CPC ......... F21S 41/265; F21V 5/007; F21V 5/045
See application file for complete search history.

(56) References Cited

U.S. PATENT DOCUMENTS

| | | | | |
|---|---|---|---|---|
| 2022/0049830 | A1* | 2/2022 | Lee | F21S 41/322 |
| 2023/0258311 | A1* | 8/2023 | Han | F21S 41/151<br>362/512 |
| 2024/0200743 | A1* | 6/2024 | Jin | F21S 41/43 |

* cited by examiner

*Primary Examiner* — Robert J May
(74) *Attorney, Agent, or Firm* — NSIP Law

(57) ABSTRACT

A lamp includes light sources, and MFLs corresponding to the light sources, each light source is configured to output light along an optical axis, each MFL is configured to receive the light output from the respective light source and to transmit the received light, and the MFLs include a central MFL, to which a first light output from a central light source is input, and from which the first light is output to form a central part of a light distribution pattern, a peripheral MFL, to which a second light output from a peripheral light source is input, and from which the second light is output to form a peripheral part of the light distribution pattern, wherein an intensity of illumination of the peripheral part of the light distribution pattern is lower than an intensity of illumination of the central part of the light distribution pattern.

10 Claims, 3 Drawing Sheets

LAMP HAVING LIGHT SOURCES WITH CORRESPONDING ARRAY OF CENTRAL AND PERIPHERAL MULTI-FACETED- LENS FORMING CENTRA AND PERIPHERAL PARTS OF A LIGHT DISTRIBUTION

CROSS-REFERENCE TO RELATED APPLICATION

This application claims the benefit of priority under 35 U.S.C. § 119 to Korean Patent Application No. 10-2023-0027011, filed in the Korean Intellectual Property Office on Feb. 28, 2023, the entire disclosure of which is incorporated herein by reference for all purposes.

BACKGROUND

1. Field

The present disclosure relates to a lamp.

2. Discussion of Related Art

In general, headlamps provided on a front side of a vehicle may secure a visibility of a front side of a driver by irradiating light to the front side. The headlamps, as an example, may be matrix headlamps. A matrix headlamp is one of headlamp systems of a vehicle, and a lighting pattern may be adjusted according to road situations by using LEDs that provide a high brightness and a fine field of view.

Meanwhile, in recent years, to reinforce a function of securing a visibility of a front side of a driver and differentiation of design and an aesthetic aspect, interests in matrix headlamps that may implement a differentiated lighting image have been consistently increased.

A conventional matrix headlamp may form a specific light distribution pattern through a central light that passes through a vicinity of a horizontal focus of an outer lens, and a peripheral light that passes a point that is spaced apart from the horizontal focus. Meanwhile, a light distribution pattern formed when both of the central light and the peripheral light are turned on may be implemented as the central light and the peripheral light may partially overlap each other. In other words, as a central light distribution pattern formed by the central light and a peripheral light distribution pattern formed by the peripheral light partially interfere with each other, pattern areas, which a central area of the outer lens, from which the central light is output, and a peripheral area thereof, from which the peripheral light is output, are responsible for, are not clearly distinguished. In this way, because the pattern areas, which the central area and the peripheral area are responsible for, are not clearly distinguished, it is difficult to form a targeted lighting/non-lighting image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a lamp including a plurality of light sources, and a plurality of multi-facet lens (MFL) corresponding to the plurality of light sources, respectively, wherein each light source of the plurality of light sources is configured to output light along an optical axis extending away from the each light source, wherein each MFL of the plurality of MFLs is configured to receive the light output from the respective light source and to transmit the received light, and wherein the plurality of MFLs include a central MFL, to which a first light output from a central light source, from among the plurality of light sources, is input, and from which the first light is output to form a central part of a light distribution pattern, a peripheral MFL, to which a second light output from a peripheral light source, from among the plurality of light sources, is input, and from which the second light is output to form a peripheral part of the light distribution pattern, wherein an intensity of illumination of the peripheral part of the light distribution pattern is lower than an intensity of illumination of the central part of the light distribution pattern, wherein a horizontal focus of the central MFL overlaps a central optical axis that is an optical axis of the central light source with respect to a leftward/rightward direction or is spaced apart therefrom by a central distance, and wherein a horizontal focus of the peripheral MFL is spaced apart from a peripheral optical axis that is an optical axis of the peripheral light source by a peripheral distance that is larger than the central distance, with respect to the leftward/rightward direction.

A direction in which the peripheral optical axis faces the horizontal focus of the peripheral MFL may be a first direction, and the light input to the peripheral MFL may be output from the peripheral MFL to be inclined in the first direction with respect to the peripheral optical axis.

The peripheral MFL may include a first peripheral MFL, and a second peripheral MFL disposed on a side of the first peripheral MFL in the first direction, wherein the peripheral light source may include a first peripheral light source corresponding to the first peripheral MFL, and a second peripheral light source corresponding to the second peripheral MFL, and wherein a degree, by which the light output from the first peripheral MFL may be inclined with respect to a first peripheral optical axis that is an optical axis of the first peripheral light source, is smaller than a degree, by which the light output from the second peripheral MFL is inclined with respect to a second peripheral optical axis that is an optical axis of the second peripheral light source.

A first peripheral distance that is a leftward/rightward spacing distance between a horizontal focus of the first peripheral MFL and the first peripheral optical axis that is the optical axis of the first peripheral light source may be smaller than a second peripheral distance that is a leftward/rightward spacing distance between a horizontal focus of the second peripheral MFL and the second peripheral optical axis that is the optical axis of the second peripheral light source.

A curved surface that is convex rearwards may be formed on a side of the peripheral MFL proximal to the plurality of light sources, and wherein a rear end of the curved surface may be disposed on a side that is opposite to a side of the peripheral optical axis in the first direction.

A plurality of facets may be formed on a side of the plurality of MFLs distal to the plurality of light sources, and wherein steps may be formed between adjacent facets of the of the plurality of facets.

A first curved surface spacing distance that is a leftward/rightward spacing distance between a rear end of a curved surface of the first peripheral MFL and the first peripheral optical axis may be smaller than a second curved surface spacing distance that is a leftward/rightward spacing distance between a rear end of a curved surface of the second peripheral MFL and the second peripheral optical axis.

The first peripheral MFL and the second peripheral MFL may be sequentially arranged along the first direction.

The lamp may include a plurality of condensing lenses corresponding to the plurality of light sources and the plurality of MFLs, respectively, and each condensing lens of the plurality of condensing lenses may be configured to receive the light output from the respective light source, and to output the light toward the respective MFL, and wherein an optical axis of any one of the plurality of light sources may cross any one of the plurality of condensing lenses and any one of the plurality of MFLs.

The plurality of light sources may be disposed on a first plane that passes the plurality of light sources and is perpendicular to a forward/rearward direction, wherein the plurality of condensing lenses may be disposed on a second plane that passes the plurality of condensing lenses and is perpendicular to the forward/rearward direction, wherein the plurality of MFLs may be disposed on a third plane that passes the plurality of MFLs and is perpendicular to the forward/rearward direction, and wherein the first plane, the second plane, and the third plane may be sequentially arranged along the forward/rearward direction.

Other features and aspects will be apparent from the following detailed description, the drawings, and the claims.

Figure 1:
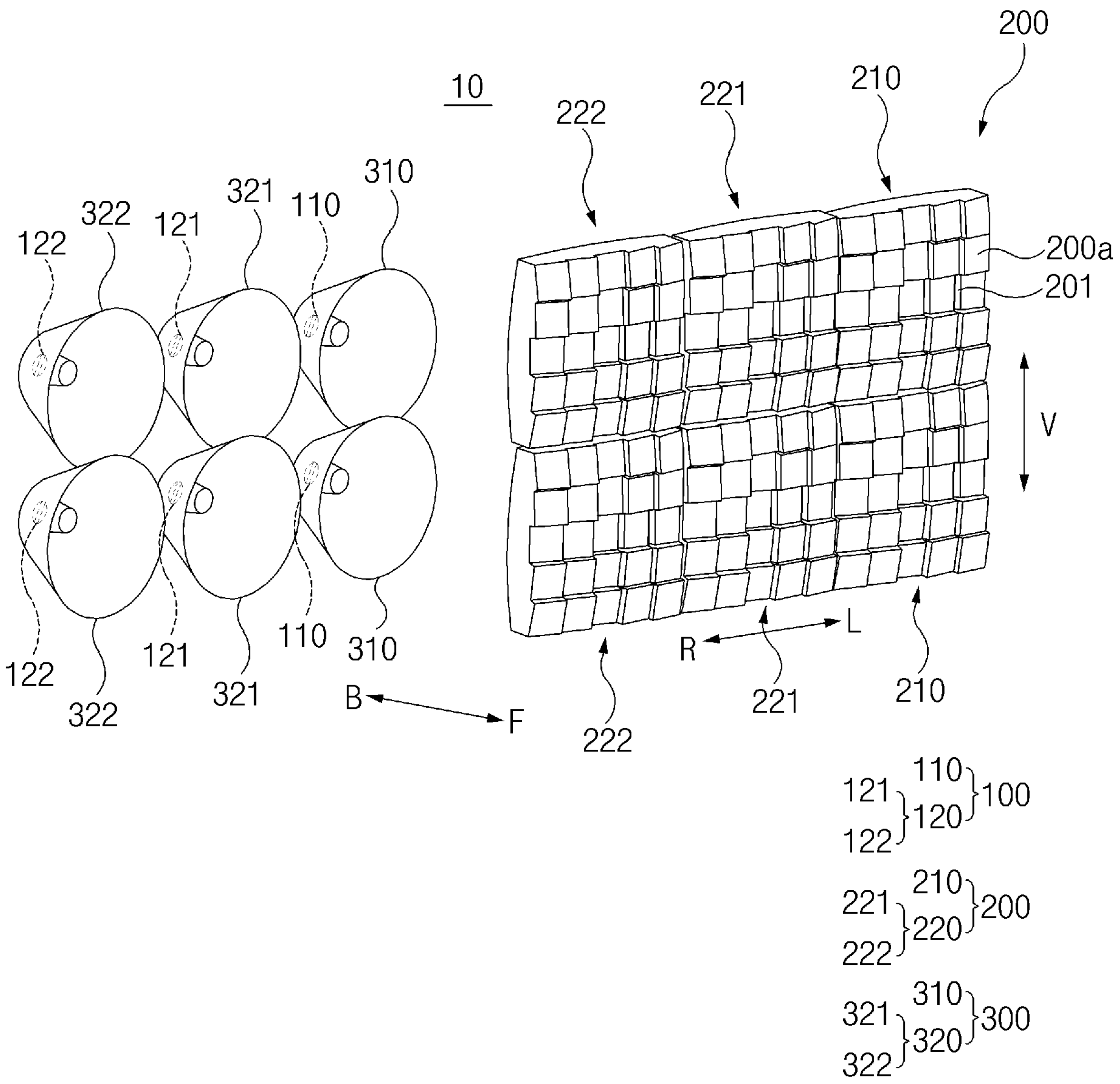
FIG. 1 is a perspective view of a lamp according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Furthermore, in describing the components of the embodiments of the present disclosure, terms, such as first, second, "A", "B", (a), and (b) may be used. The terms are simply for distinguishing the components, and the essence, the sequence, and the order of the corresponding components are not limited by the terms. It should be understood that, when it is described a component is "input to", "passes through", or is "output from" another component, the former component may be directly input to, passes through, or is output from the latter component, but a third component may be "input", "passes", or is "output" between the two components.

Hereinafter, a lamp 10 according to an embodiment of the present disclosure will be described with reference to the drawings.

The lamp 10 may independently implement a plurality of segment patterns that form a light distribution pattern "P". The lamp 10, as an example, may be a matrix headlamp. The matrix headlamp may output light such that a segment pattern is formed at a targeted location, and may not output light such that no segment pattern is formed at a location that is not targeted. Furthermore, the lamp 10 may be named an adaptive driving beam (ADB). Referring to FIG. 1, the lamp 10 may include a light source 100, a multi-facet lens 200, and a condensing lens 300.

Figure 2:
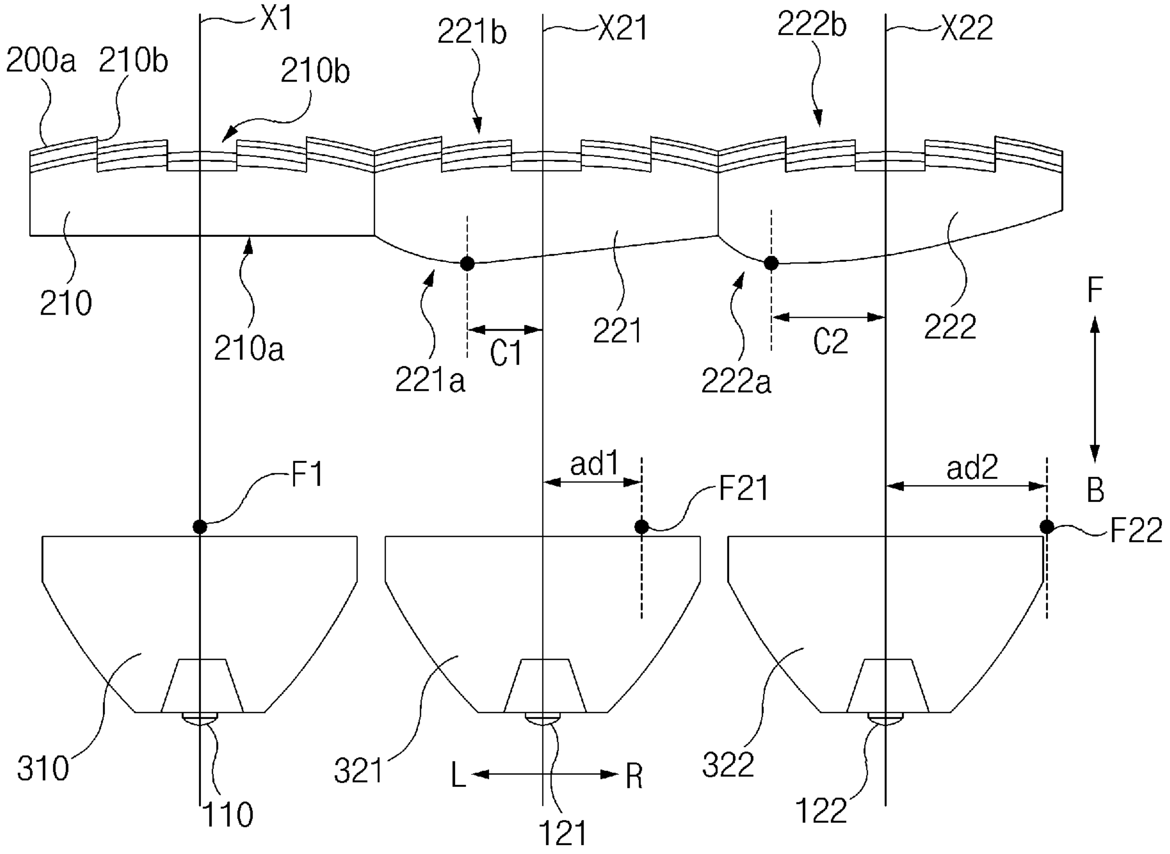
FIG. 2 is a plan view of a lamp according to an embodiment of the present disclosure.

Referring back to FIG. 2, the light source 100 may output light with reference to an optical axis that extends to a front side "F". For example, light located at a central portion of a light bundle output from the light source 100 may travel in parallel to the optical axis. Furthermore, the light located at a peripheral part of the light bundle output from the light source 100 may travel to the front side, and may travel to be inclined in a direction that becomes farther away from the optical axis. A center of the light source 100, as an example, may be disposed on a rear side "B" of the condensing lens 300. The light source 100, for example, may be a light-emitting diode. A plurality of light sources 100 may be provided. The plurality of light sources 100 may include a central light source 110 and a peripheral light source 120.

The central light source 110 may output the light with reference to a central optical axis X1 that is an optical axis that extends to the front side "F". The light output from the central light source 110 may form a central light distribution pattern Pc that is a central part of the light distribution pattern "P". A plurality of central light sources 110 may be provided. The plurality of central light sources 110 may be arranged along a horizontal direction, or may be arranged along a vertical direction. Furthermore, the plurality of central light sources 110 may be arranged in a form of a matrix having two or more rows and two or more columns.

The peripheral light source 120 may output the light with reference to a peripheral optical axis that is an optical axis that extends to the front side "F". The peripheral optical axis may be parallel to a central optical axis X1. Furthermore, the peripheral optical axis may be spaced apart from the central optical axis X1 in a leftward/rightward direction. The light output from the peripheral light source 120 may form peripheral light distribution patterns Pa1 and Pa2 that are peripheral parts of the light distribution pattern "P". The peripheral light source 120 may include a first peripheral light source 121 and a second peripheral source 122.

The first peripheral light source 121 may output the light with reference to a first peripheral optical axis X21 that is an optical axis that extends to the front side "F". The light output from the first peripheral light source 121 may form the first peripheral light distribution pattern Pa1 that is a portion of peripheral light distribution patterns Pa1 and Pa2. Furthermore, the first peripheral light source 121 may be disposed on a side of the central light source 110 in a specific direction. The specific direction may be defined as a direction that faces a peripheral MFL 220 that will be described below. The specific direction, for example, may include a leftward direction "L" and a rightward direction "R".

A plurality of first peripheral light sources 120 may be provided. The plurality of first peripheral light sources 120 may include a first left peripheral light source that is disposed on a left side of the central light source 110, and a first right peripheral light source that is disposed on a right side of the central light source 110.

The second peripheral light source 122 may output the light with reference to a second peripheral optical axis X22 that is an optical axis that extends to the front side "F". The second peripheral optical axis X22 may be located on a side of the first peripheral optical axis X21 in the specific direction. In other words, with respect to the leftward/rightward direction, the first peripheral optical axis X21 may be located between the central optical axis X1 and the second peripheral optical axis X22.

The light output from the second peripheral light source 122 may form the second peripheral light distribution pattern Pa2 that is a portion of the peripheral light distribution patterns Pa1 and Pa2. For example, with respect to the leftward/rightward direction, the first peripheral light distribution pattern Pa1 may be formed between the central light distribution pattern Pc and the second peripheral light distribution pattern Pa2.

The second peripheral light source 122 may be disposed on a side of the first peripheral light source 121 in the specific direction. A plurality of second peripheral light sources 122 may be provided. The plurality of second peripheral light sources 122 may include a second left peripheral light source that is disposed on a left side of the first left peripheral light source, and a second right peripheral light source that is disposed on a right side of the first right peripheral light source. For example, the second left peripheral light source, the first left peripheral light source, the central light source 110, the first right peripheral light source, and the second right peripheral light source may be sequentially arranged along the leftward/rightward direction.

The light output from the condensing lens 300 may be input to, pass through, and then output from the MFL 200. A plurality of facets 200*a* may be formed in a light output area of the MFL 200. The light output area of the MFL 200 may be defined as an area, in which the light is output from the MFL 200. For example, the light output area of the MFL 200 may define a front side of the MFL 200. Steps 201 may be formed between two adjacent ones 200*a* of the plurality of facets 200*a*. A plurality of MFLs 200 may be provided. The plurality of MFLs 200 may include a central MFL 210 and the peripheral MFL 220.

The light output from the central MFL 210 may form the central light distribution pattern Pc. The central MFL 210 may correspond to the central light source 110. For example, the central MFL 210 and the central light source 110 may face each other along a forward/rearward direction.

Furthermore, a central horizontal focus F1 that is a horizontal focus of the central MFL 210 may overlap the central optical axis X1 with respect to the leftward/rightward direction. For example, when the lamp 10 is viewed in the upward/downward direction "V", the central horizontal focus F1 and the central optical axis X1 may overlap each other.

As another example, the central horizontal focus F1 may be spaced apart from the central optical axis X1 with respect to the leftward/rightward direction. Then, a leftward/rightward spacing distance between the central horizontal focus F1 and the central optical axis X1 may be named a central distance. Furthermore, the central horizontal focus F1 may be formed at a location that is the same as a central vertical focus that is a vertical focus of the central MFL 210. However, the present disclosure is not limited to the example, and the central horizontal focus F1 and the central vertical focus may be formed to be different.

A plurality of central MFLs 210 may be provided. For example, the plurality of central MFLs 210 may be arranged along a horizontal direction, or may be arranged along a vertical direction. Meanwhile, although not illustrated, the plurality of central MFLs 210 may be arranged in a form of a matrix having two or more rows and two or more columns. In other words, the plurality of central MFLs 210 may be arranged to correspond to the plurality of central light sources 110, respectively. The central MFL 210 may include a central light input area 210*a* and a central light output area 210*b*.

The light output from the condensing lens 300 may be input to the central light input area 210*a*. The central light input area 210*a* may define a rear side of the central MFL 210. The light input to the central light input area 210*a* may be output from the central light output area 210*b*. A plurality of facets may be provided in the central light output area 210*b*. Furthermore, steps may be formed between adjacent ones of the plurality of facets provided in the central light output area 210*b*.

The light output from the peripheral MFL 220 may form the peripheral light distribution patterns Pa1 and Pa2. The peripheral MFL 220 may correspond to the peripheral light source 120. For example, the peripheral MFL 220 and the peripheral light source 120 may face each other along the forward/rearward direction.

Furthermore, a peripheral horizontal focus that is a horizontal focus of the peripheral MFL 220 may be spaced apart from the peripheral optical axis with respect to the leftward/rightward direction. The peripheral horizontal focus may be located on a side of the peripheral optical axis in the specific direction. For example, when the peripheral horizontal focus is located on a right side "R" of the peripheral optical axis, the light output from the peripheral MFL 220 may travel to be inclined to a right side of the peripheral optical axis. As another example, when the peripheral horizontal focus is located on a left side "L" of the peripheral optical axis, the light output from the peripheral MFL 220 may travel to be inclined to a left side of the peripheral optical axis.

Furthermore, the peripheral horizontal focus and a peripheral vertical focus that is a vertical focus of the peripheral MFL 220 may be formed to be different. Meanwhile, the vertical foci of the central MFL 210 and the peripheral MFL 220 located on the same row may correspond to each other in an upward direction "V" and the forward/rearward direction. For example, when the lamp 10 is viewed in the leftward/rightward direction, the vertical foci of the central MFL 210 and the peripheral MFL 220 located on the same row may overlap each other.

A leftward/rightward spacing distance between the peripheral horizontal focus and the peripheral optical axis may be named a peripheral distance. The peripheral distance may be larger than the central distance. Furthermore, as the peripheral distance becomes larger, a peripheral orientation angle that is an orientation angle of the light output from the peripheral MFL 220 may become larger.

The peripheral orientation angle may be defined as an average of angles defined by the lights output from the peripheral MFL 220 and the peripheral optical axis. Furthermore, as the peripheral distance becomes larger, a leftward/rightward width of the peripheral light distribution patterns Pa1 and Pa2 may become larger. The peripheral MFL 220 may include a peripheral light input area 220*a* and a peripheral light output area 220*b*.

The light output from the peripheral light source 120 may be input to the peripheral light input area 220*a* after passing through the condensing lens 300. The peripheral light input area 220*a* may define a rear side of the peripheral MFL 220. The peripheral light input area 220*a* may have a curved surface that is convex rearwards.

A rear end of the curved surface of the peripheral light input area 220*a* may be disposed on a side that is opposite to a side of the peripheral optical axis in the specific direction. For example, when the specific direction is the rightward direction "R", a rear end of the curved surface of the peripheral light input area 220*a* may be disposed on a left side of the peripheral optical axis. A leftward/rightward spacing distance between the rear end of the curved surface of the peripheral light input area 220*a* and the peripheral optical axis may be named a curved surface spacing distance.

A location of the peripheral horizontal focus may be determined according to the rear end of the curved surface of the peripheral light input area 220*a*. For example, as a location of the rear end of the curved surface of the peripheral light input area 220*a* becomes farther away from the peripheral optical axis in an opposite direction (as an example, a leftward direction "L") to the specific direction, a location of the peripheral horizontal focus may be formed to become farther away from the peripheral optical axis in the specific direction (as an example, the rightward direction "R").

The light input to the peripheral light input area 220*a* may be output from the peripheral light output area 220*b*. A plurality of facets may be formed in the peripheral light output area 220*b*. Furthermore, steps may be formed between adjacent ones of the plurality of facets provided in the peripheral light output area 220*b*. A plurality of peripheral MFLs 220 may be provided. The plurality of peripheral MFLs 220 may include a first peripheral MFL 221 and a second peripheral MFL 222.

The light output from the first peripheral MFL 221 may form the first peripheral light distribution pattern Pa1 that is a portion of the peripheral light distribution patterns Pa1 and Pa2. Furthermore, the first peripheral MFL 221 may be disposed on a side of the central MFL 210 in the specific direction.

Furthermore, a first peripheral horizontal focus F21 that is a horizontal focus of the first peripheral MFL 221 may be spaced apart from the first peripheral optical axis X21 with respect to the leftward/rightward direction. The first peripheral horizontal focus may be located on a side of the first peripheral optical axis X21 in the specific direction. A leftward/rightward spacing distance between the first peripheral horizontal focus F21 and the first peripheral optical axis X21 may be named a first peripheral distance ad1. Furthermore, an average of angles defined by the lights output from the first peripheral MFL 221 and the first peripheral optical axis X21 may be named as a first peripheral orientation angle.

The first peripheral MFL 221 may correspond to the first peripheral light source 121. For example, the first peripheral MFL 221 and the first peripheral light source 121 may face each other in the forward/rearward direction. The first peripheral MFL 221 may include a first peripheral light input area 221*a* and a first peripheral light output area 221*b*.

The light output from the first peripheral light source 121 may be input to the first peripheral light input area 221*a* after passing through the condensing lens 300. The first peripheral light input area 221*a* may be formed on a rear side of the first peripheral MFL 221. A rear end of the first curved surface that is a curved surface of the first peripheral light input area 221*a* may be disposed on a side that is opposite to a side of the first peripheral optical axis X21 in the specific direction. For example, when the specific direction is the rightward direction "R", the rear end of the first curved surface may be disposed on a left side of the first peripheral optical axis X21. A leftward/rightward spacing distance between the rear end of the first curved surface and the first peripheral optical axis X21 may be named a first curved surface spacing distance C1.

The light input to the first peripheral light input area 221*a* may be output from the first peripheral light output area 221*b*. The first peripheral light output area 221*b* may define a front side of the first peripheral MFL 221.

A plurality of first peripheral MFLs 221 may be provided. The plurality of first peripheral MFLs 221 may include a first left peripheral MFL that is disposed on a left side of the central MFL 210, and a first right peripheral MFL that is disposed on a right side of the central MFL 210.

The light output from the second peripheral MFL 222 may form a second peripheral light distribution pattern Pa2 that is a portion of the peripheral light distribution patterns Pa1 and Pa2. Furthermore, the second peripheral MFL 222 may be disposed on a side of the first peripheral MFL 221 in the specific direction.

Furthermore, a second peripheral horizontal focus F22 that is a horizontal focus of the second peripheral MFL 222 may be spaced apart from the second peripheral optical axis X22 with respect to the leftward/rightward direction. The second peripheral horizontal focus F22 may be located on a side of the second peripheral optical axis X22 in the specific direction.

A leftward/rightward spacing distance between the second peripheral horizontal focus F22 and the second peripheral optical axis X22 may be named a second peripheral distance ad2. The second peripheral distance ad2 may be formed to be larger than the first peripheral distance ad1.

Furthermore, an average of angles defined by the lights output from the second peripheral MFL 222 and the second peripheral optical axis X22 may be named a second peripheral orientation angle. The second peripheral orientation angle may be formed to be larger than the first peripheral orientation angle. In other words, a degree, by which the light output from the first peripheral MFL 221 is inclined with respect to the first peripheral optical axis X21, is smaller than a degree, by which the light output from the second peripheral MFL 222 is inclined with respect to the second peripheral optical axis X22.

In this way, because the orientation angle is formed to become larger as it goes from the central MFL 210 in the specific direction, an intensity of illumination of the light distribution pattern "P" becomes lower as it goes farther away from the central light distribution pattern Pc in the specific direction, and a width of the light distribution pattern in the leftward/rightward direction becomes larger.

The second peripheral MFL 222 may correspond to the second peripheral light source 122. For example, the second peripheral MFL 222 and the second peripheral light source 122 may face each other in the forward/rearward direction. The second peripheral MFL 222 may include a second peripheral light input area 222*a* and a second peripheral light output area 222*b*.

The light output from the second peripheral light source 122 may be input to the second peripheral light input area 222*a* after passing through the condensing lens 300. The second peripheral light input area 222*a* may define a rear side of the second peripheral MFL 222. A rear end of the second curved surface that is a curved surface of the second peripheral light input area 222*a* may be disposed on a side that is opposite to a side of the second peripheral optical axis X22 in the specific direction. For example, when the specific direction is a rightward direction "R", a rear end of the second curved surface may be disposed on a left side of the second peripheral optical axis X22.

A leftward/rightward spacing distance between the rear end of the second curved surface and the second peripheral optical axis X22 may be named a second curved surface spacing distance c2. The second curved surface spacing distance c2 may be larger than the first curved surface spacing distance C1.

The light input to the second peripheral light input area 222*a* may be output from the second peripheral light output area 222*b*. The second peripheral light output area 222*b* may define a front side of the second peripheral MFL 222.

Furthermore, a plurality of second peripheral MFLs 222 may be provided. The plurality of second peripheral MFLs 222 may include a second left peripheral MFL that is disposed on a left side of the first left peripheral MFL, and a second right peripheral MFL that is disposed on a right side of the first right peripheral MFL.

For example, the second left peripheral MFL, the first left peripheral MFL, the central MFL 210, the first right peripheral MFL, and the second right peripheral MFL may be sequentially arranged along the leftward/rightward direction.

The lights output from the plurality of light sources 100 may be input to, pass through, and be output from the condensing lens 300. The light output from the condensing lens 300, as an example, may travel in parallel to the forward/rearward direction. The light output from the condensing lens 300 may be input to the plurality of MFLs 200.

The condensing lens 300, as an example, may be a collimator. The condensing lens 300, as an example, may be a total internal reflection (TIR) lens. Furthermore, the condensing lens 300, as another example, may be a lens that is provided with a total reflection surface. In a more detailed example, any portion of the light output from the light source 100 may be output after being totally reflected by the total reflection surface of the condensing lens 300, and another portion thereof may be output from a central part of the condensing lens 300 after passing threrethrough.

A plurality of condensing lenses 300 may be provided. The plurality of condensing lenses 300 may correspond to the plurality of light sources 100 and the plurality of MFLs 200. For example, an optical axis provided by any one of the plurality of light sources 100 may cross one light source 100, one condensing lens 300, and one MFL 200. In other words, the optical axes provided by the plurality of light sources 100 may cross one light source 100, one condensing lens 300, and one MFL 200.

Furthermore, the plurality of light sources 100 may be disposed on a first plane that is an imaginary plane that passes through the plurality of light sources 100 and is perpendicular to the forward/rearward direction. Furthermore, the plurality of condensing lenses 300 may be disposed on a second plane that is an imaginary plane that passes through the plurality of condensing lenses 300 and is perpendicular to the forward/rearward direction. Furthermore, the plurality of MFLs 200 may be disposed on a third plane that is an imaginary plane that passes through the plurality of MFLs 200 and is perpendicular to the forward/rearward direction. The first plane, the second plane, and the third plane may be sequentially arranged along the forward/rearward direction.

The plurality of condensing lens may include a central condensing lens 310 and a peripheral condensing lens 320. The light output from the central light source 110 may be input to the central condensing lens 310. Furthermore, the light output from the central condensing lens 310 may be input to the central MFL 210. The central condensing lens 310 may be disposed between the central light source 110 and the central MFL 210, with respect to the forward/rearward direction.

The light output from the peripheral light source 120 may be input to the peripheral condensing lens 320. Furthermore, the light output from the peripheral condensing lens 320 may be input to the peripheral MFL 220. The peripheral condensing lens 320 may be disposed between the peripheral light source 120 and the peripheral MFL 220, with respect to the forward/rearward direction. A plurality of peripheral condensing lenses 320 may be provided. The plurality of peripheral condensing lenses 320 may include a first peripheral condensing lens 321 and a second peripheral condensing lens 322.

The light output from the first peripheral light source 121 may be input to the first peripheral condensing lens 321. Furthermore, the light output from the first peripheral condensing lens 321 may be input to the first peripheral MFL 221. The first peripheral condensing lens 321 may be disposed between the first peripheral light source 121 and the first peripheral MFL 221, with respect to the forward/rearward direction. Furthermore, the first peripheral condensing lens 321 may be disposed on a side of the central condensing lens 310 in the specific direction.

A plurality of first peripheral condensing lenses 321 may be provided. The plurality of first peripheral condensing lenses 321 may include a first left peripheral condensing lens that is disposed on a left side of the central condensing lens 310, and a first right peripheral condensing lens that is disposed on a right side of the central condensing lens 310.

The light output from the second peripheral light source 122 may be input to the second peripheral condensing lens 322. Furthermore, the light output from the second peripheral condensing lens 322 may be input to the second peripheral MFL 222. The second peripheral condensing lens 322 may be disposed between the second peripheral light source 122 and the second peripheral MFL 222, with respect to the forward/rearward direction. The second peripheral condensing lens 322 may be disposed on a side of the first peripheral condensing lens 321 in the specific direction.

Furthermore, a plurality of second peripheral condensing lenses 322 may be provided. The plurality of second peripheral condensing lenses 322 may include a second left peripheral condensing lens that is disposed on a left side of the first left peripheral condensing lens, and a second right peripheral condensing lens that is disposed on a right side of the first right peripheral condensing lens.

For example, the second left peripheral condensing lens, the first left peripheral condensing lens, the central condensing lens 310, the first right peripheral condensing lens, and the second right peripheral condensing lens may be sequentially arranged along the leftward/rightward direction.

Furthermore, one light source 100, one condensing lens 300, and one MFL 200, which are located on the same optical axis, may be defined as one optical module. A plurality of optical modules may be provided. The plurality of optical modules may be included in the lamp 10.

The plurality of optical modules may include a central optical module, a first left optical module, a second left optical module, a first right optical module, and a second right optical module. The central optical module may include a central light source 110, a central condensing lens 310, and a central MFL 210.

The first left optical module may include a first left peripheral light source, a first left condensing lens, and a first left peripheral MFL. Furthermore, the second left optical module may include a second left peripheral light source, a second left condensing lens, and a second left peripheral MFL.

The first right optical module may include a first right peripheral light source, a first right condensing lens, and a first right peripheral MFL. Furthermore, the second right optical module may include a second right peripheral light source, a second right condensing lens, and a second right peripheral MFL.

However, the present disclosure is not limited to the example, and the plurality of optical modules may include a larger number of optical modules, in addition to the first left optical module, the second left optical module, the first right optical module, and the second right optical module.

Furthermore, the plurality of optical modules may be in any one of a lighting state and a non-lighting state. For example, the plurality of optical modules may be independently controlled. In a more detailed example, some of the plurality of optical modules may be in a lighting state and others may be in a non-lighting state.

Hereinafter, referring further to FIG. 3, the light distribution pattern "P" formed by the central optical module, the first right optical module, and the second right optical module will be described.

Two central optical modules, two first right optical modules, and two second right optical modules, as an example, may be arranged in the upward/downward direction "V". However, the present disclosure is not limited to the example, three or more central optical modules, three or more first right optical modules, and three or more second right optical modules may be arranged in a vertical direction "V".

Figure 3:
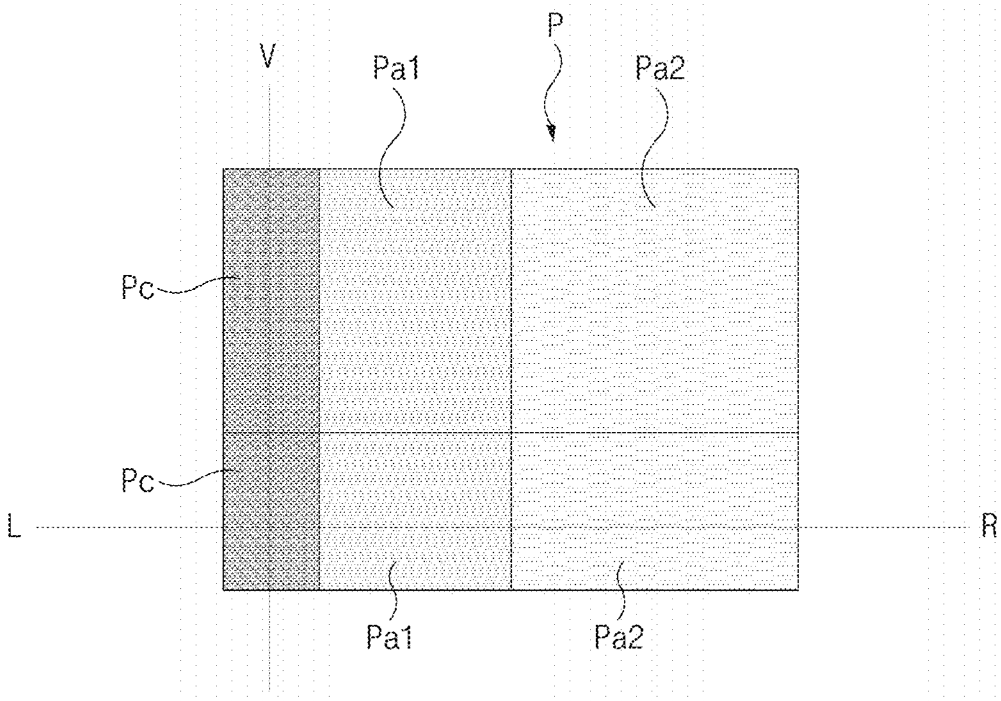
FIG. 3 is a view illustrating a light distribution pattern formed by a lamp according to an embodiment of the present disclosure.

Referring to FIG. 3, the central optical module may form the central light distribution pattern Pc that is a central part of the light distribution pattern "P". Furthermore, two central light distribution patterns Pc that are formed by two central optical modules, respectively, may be arranged along the vertical direction "V".

Furthermore, the first right optical module may form a light distribution pattern (the first right light distribution pattern) that is located on a right side of the central light distribution pattern Pc among the first peripheral light distribution patterns Pa1. Furthermore, two first right distribution patterns that are formed by two first right optical modules, respectively, may be arranged along the upward/downward direction "V".

Furthermore, the second right optical module may form a light distribution pattern (the second right light distribution pattern) that is located on a right side of the first right light distribution pattern among the second peripheral light distribution pattern Pa2. Furthermore, two second right light distribution patterns that are formed by two second right optical modules may be arranged along the upward/downward direction "V".

Furthermore, although not illustrated in the drawings, the first left optical module may form a light distribution pattern (the first left light distribution pattern) that is symmetrical to the first right light distribution pattern among the first peripheral light distribution pattern Pa1 with respect to the central light distribution pattern Pc.

Furthermore, the second left optical module may form a light distribution pattern (the second left light distribution pattern) that is symmetrical to the second right light distribution pattern of the second peripheral light distribution pattern Pa2 with respect to the central light distribution pattern Pc.

The lamp according to the present disclosure may form a targeted lighting/non-lighting image by allowing an area that defines a central area of a light distribution pattern and an area that defines a peripheral part of the light distribution pattern to be clearly distinguished.

The lamp according to the present disclosure may provide a lamp, by which an area that defines a central area of a light distribution pattern and an area that defines a peripheral part of the light distribution pattern are clearly distinguished.

Even when it has been described above that all the components that constitute the embodiments of the present disclosure are combined into one or are combined to be operated, the present disclosure is not limited to the embodiments. That is, all the components may be selectively combined into one to be operated with a range of the purpose of the present disclosure. Further, because the above-described terms, such as "comprising", "including", or "having" mean that the corresponding components may be included unless particularly described in an opposite way, it should be construed that another component is not excluded but may be further included. Unless defined differently, all the terms including technical or scientific terms have the same meanings as those generally understood by an ordinary person in the art, to which the present disclosure pertains. The generally used terms such as the terms defined in advance should be construed to coincide with the context meanings of the related technologies, and should not be construed as ideal or excessively formal meanings unless defined explicitly in the present disclosure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lamp comprising:

light sources; and multi-facet lenses (MFL) respectively corresponding to the light sources, wherein each light source of the light sources is configured to output light along an optical axis extending away therefrom, wherein each MFL of the MFLs is configured to receive the light output from the respectively corresponding light source and to transmit the received light, and wherein the MFLs comprise a central MFL, to which first light output from a central light source, among the light sources, is input, and from which the first light is output to form a central part of a light distribution pattern, a peripheral MFL, to which second light output from a peripheral light source, from among the light sources, is input, and from which the second light is output to form a peripheral part of the light distribution pattern, wherein an intensity of illumination of the peripheral part of the light distribution pattern is lower than an intensity of illumination of the central part of the light distribution pattern, wherein a horizontal focus of the central MFL overlaps a central optical axis that is the optical axis of the central light source with respect to a leftward/rightward direction or is spaced apart therefrom by a central distance, and wherein a horizontal focus of the peripheral MFL is spaced apart from a peripheral optical axis that is the optical axis of the peripheral light source by a peripheral distance that is larger than the central distance, with respect to the leftward/rightward direction.

2. The lamp of claim 1, wherein a direction in which the peripheral optical axis faces the horizontal focus of the peripheral MFL is a first direction, and the light input to the peripheral MFL is output from the peripheral MFL to be inclined in the first direction with respect to the peripheral optical axis.

3. The lamp of claim 2, wherein the peripheral MFL comprises a first peripheral MFL, and a second peripheral MFL disposed on a side of the first peripheral MFL in the first direction, wherein the peripheral light source comprises a first peripheral light source corresponding to the first peripheral MFL, and a second peripheral light source corresponding to the second peripheral MFL, and wherein a degree, by which the light output from the first peripheral MFL is inclined with respect to a first peripheral optical axis that is an optical axis of the first peripheral light source, is smaller than a degree, by which the light output from the second peripheral MFL is inclined with respect to a second peripheral optical axis that is an optical axis of the second peripheral light source.

4. The lamp of claim 3, wherein a first peripheral distance that is a leftward/rightward spacing distance between a horizontal focus of the first peripheral MFL and the first peripheral optical axis that is the optical axis of the first peripheral light source is smaller than a second peripheral distance that is a leftward/rightward spacing distance between a horizontal focus of the second peripheral MFL and the second peripheral optical axis that is the optical axis of the second peripheral light source.

5. The lamp of claim 3, wherein a curved surface that is convex rearwards is formed on a side of the peripheral MFL proximal to the light sources, and wherein a rear end of the curved surface is disposed on a side that is opposite to a side of the peripheral optical axis in the first direction.

6. The lamp of claim 5, wherein a plurality of facets are formed on a side of the MFLs distal to the light sources, and wherein steps are formed between adjacent facets of the of the plurality of facets.

7. The lamp of claim 5, wherein a first curved surface spacing distance that is a leftward/rightward spacing distance between a rear end of a curved surface of the first peripheral MFL and the first peripheral optical axis is smaller than a second curved surface spacing distance that is a leftward/rightward spacing distance between a rear end of a curved surface of the second peripheral MFL and the second peripheral optical axis.

8. The lamp of claim 3, wherein the first peripheral MFL and the second peripheral MFL are sequentially arranged along the first direction.

9. The lamp of claim 1, further comprising condensing lenses corresponding to the light sources and the MFLs, respectively:

each condensing lens of the condensing lenses is configured to receive the light output from the respective light source, and to output the light toward the respective MFL; and an optical axis of any one of the light sources crosses any one of the condensing lenses and any one of the MFLs.

10. The lamp of claim 9, wherein the light sources are disposed on a first plane that passes the light sources and is perpendicular to a forward/rearward direction, wherein the condensing lenses are disposed on a second plane that passes the condensing lenses and is perpendicular to the forward/rearward direction, wherein the MFLs are disposed on a third plane that passes the MFLs and is perpendicular to the forward/rearward direction, and wherein the first plane, the second plane, and the third plane are sequentially arranged along the forward/rearward direction.

* * * * *